United States Patent [19]

DiPietro et al.

[11] Patent Number: 4,616,926
[45] Date of Patent: Oct. 14, 1986

[54] FILM VIDEO PLAYER/PRINTER

[75] Inventors: Matthew DiPietro, Webster; Daniel C. Maslanka, Rochester, both of N.Y.

[73] Assignee: Eastman Kodak Company, Rochester, N.Y.

[21] Appl. No.: 770,120

[22] Filed: Aug. 28, 1985

[51] Int. Cl.⁴ .................... G03B 13/28; H04N 5/84
[52] U.S. Cl. ..................................... 355/45; 354/76; 355/20; 358/244
[58] Field of Search ............... 358/244, 227, 302, 54; 355/20, 45; 354/76

[56] References Cited

U.S. PATENT DOCUMENTS

| | | | |
|---|---|---|---|
| 2,968,215 | 1/1961 | Goodman | 355/20 X |
| 3,345,458 | 10/1963 | Cole et al. | 178/6.8 |
| 3,459,888 | 8/1969 | Sokolov | 355/20 X |
| 3,688,654 | 9/1972 | Nielsen | 354/76 |
| 3,794,756 | 2/1974 | Hahn et al. | 355/20 X |
| 3,824,336 | 7/1974 | Gould et al. | 358/227 X |
| 3,872,462 | 3/1975 | Lemelson | 354/76 X |
| 4,482,924 | 11/1984 | Brownstein | 358/302 |
| 4,485,406 | 11/1984 | Brownstein | 358/227 |
| 4,495,516 | 1/1985 | Moore et al. | 358/54 |

FOREIGN PATENT DOCUMENTS 0149196 12/1984 European Pat. Off. .
0149257 12/1984 European Pat. Off. .
58100124 12/1981 Japan .

Primary Examiner—Richard A. Wintercorn
Attorney, Agent, or Firm—Dennis P. Monteith

[57] ABSTRACT

A film video player/printer allows an operator to display a video image of a photographic film in a normal orientation while magnifying and composing the magnified image according to a desired format (vertical or horizontal) portrayed by the display. Reticle-generating circuitry selectively rotates a rectangular reticle centered on the display, the reticle portraying the border and thereby the format of a print to be made. A turntable serves for selectively rotating the film about an optical centerline of the film video player/printer, to provide for the display of the film image in the normal viewing orientation and to provide for a print corresponding to the image and format displayed. With the film being rotated about the optical centerline and with the aspect ratio of a vertical reticle being the reciprocal of the aspect ratio of a horizontal reticle, an optical print is made without any need to compose or magnify the image to compensate for any rotation of the film for printing.

11 Claims, 8 Drawing Figures

FILM VIDEO PLAYER/PRINTER

CROSS-REFERENCE TO A RELATED APPLICATION

Reference is hereby made to U.S. patent application Ser. No. 770,121, entitled Film Video Player/Printer With Cropping Control by S. Brownstein, filed on Aug. 28, 1985.

BACKGROUND OF THE INVENTION

1. Field Of The Invention

The present invention relates to a film video player/printer. More particularly, the invention relates to a film video player/printer of minimal complexity for making a customized optical print corresponding to a film image shown on a video display.

2. Description Relative To The Background Art

Cropping is a photographic printing technique in which a photofinisher effectively eliminates a portion of a photographic original, e.g. color negative film, in order to print only a specific portion of the original image. A professional photographer routinely uses cropping and other photofinishing techniques, such as making prints in one format (either horizontal or vertical) from an original in an opposite format, to print pictures of maximum interest and visual impact. Amateur photographers, who do their own printing, likewise employ cropping and format converting to improve their prints.

A commercial photofinisher makes these services available to improve customer prints, but the services are used infrequently with mixed results. A photographic customer encounters a problem in identifying to the photofinisher exactly what part of the original is to appear in the print. The problem is aggravated, of course, because the customer often has not had the benefit of seeing either the original or a sample print.

It is believed that a photographic print could be improved considerably if a customer were provided with a convenient way of composing a picture, cropped as desired, in either or both formats, prior to deciding upon the final print format and composition.

U.S. Pat. No. 4,482,924, which is assigned to the assignee of the present invention, discloses a photographic system comprising a printer for use with a film video player in which a film image is first displayed on a video monitor such as a standard television receiver. A video player control panel serves for selectively displaying a video image corresponding to only a portion of the film image and for varying the magnification of the image displayed. When the video display is composed as desired, a recorder applies coded magnetic indicia to the film, specifying the selected magnification and cropping coordinates. The printer of the system includes a magnetic reader for reading the coded indicia, to provide for the proper magnification and cropping, to thereby make an optical print of the film corresponding to the image on the video display.

Although the system of U.S. Pat. No. 4,482,924 provides a convenient way of displaying and composing the portion of a film image to be printed, the magnetic recording and reading of information on the film adds complexity to the photographic printing process, thereby increasing its cost and further delaying the completion of a print.

Japanese Pat. No. 58-100124 discloses unitary film video player/printer apparatus having variable magnification fills a central rectangular area of a video screen, a zoom lens setting is noted and used to set a printing lens and/or printing paper position, to thereby make a print of the film image corresponding to the video image filling the central area of the screen.

Although the Japanese patent discloses a way that a customer can visualize a photographic picture prior to the making of a print, the apparatus appears to permit only variable magnification of the film image, without cropping. Furthermore, the apparatus of the Japanese patent, like the apparatus of the aforementioned U.S. Pat. No. 4,482,924, fails to provide for printing in a format other than that which is fixed by the film image. Additionally, in order for a photographic customer to always view a video image in a normally oriented position, the apparatus of both patents is limited to receiving a photographic film of only one particular format. The latter limitation makes it awkward to view displays of images of the opposite format, whereas the former limits the freedom to customize the format of finished prints.

SUMMARY OF THE INVENTION

In view of the foregoing, it is an object of the invention to provide a unitary film video player/printer of minimal complexity which allows an operator to display a video image of a photographic film in a normal orientation while magnifying and composing the magnified image according to a desired format portrayed by the display, and which then provides an optical print corresponding to the customized image and format displayed.

This object is achieved by providing electronic display means for selectively displaying a given rectangular reticle that is substantially centered on a video monitor, the orientation of the reticle, either vertical or horizontal, defining the border and thereby the format of a print to be made. Under operator control, the film image to be printed is then displayed, within the reticle selected, in a normal orientation, perhaps by rotating the film image, depending on its format, and by selectively magnifying and translating horizontally and vertically the film image. Under the control of an operator print command, a microprocessor-based control means then selectively rotates the film, as a function of the reticle selected, to cause a printer to make an optical print corresponding to the image and format displayed.

In a preferred embodiment of the invention, the film video player/printer includes a solid state image sensor for displaying an image of the film on the video monitor, the image sensor and the printer having a common optical axis. A zoom lens functions to magnify and minify the film image, and an X-Y translation stage serves to move the film horizontally and vertically, for cropping the film image displayed. To provide a film video player/printer of minimal complexity, in accordance with the invention, a rotatable platform serves to selectively rotate the film about an optical centerline of the film video player/printer, independently of the X-Y translation stage, either to provide for the video display in the normal orientation or to provide for a print in the desired format.

By rotating the film about the optical centerline, the print to be made corresponds to the image within the reticle selected, without having to adjust the X-Y translation stage subsequent to any rotation of the film for printing. The aspect ratio of the horizontal reticle is, of course, the reciprocal of the aspect ratio of the vertical reticle. This feature further reduces the complexity of the player/printer, because it permits the making of the print, without the need to reset the zoom lens following any rotation of the film for printing.

The invention and its other advantages will become more apparent in the detailed description of a preferred embodiment presented below.

DESCRIPTION OF THE DRAWINGS

The invention will be described with reference to the accompanying drawings, in which.

DETAILED DESCRIPTION OF A PREFERRED EMBODIMENT

Figure 1:
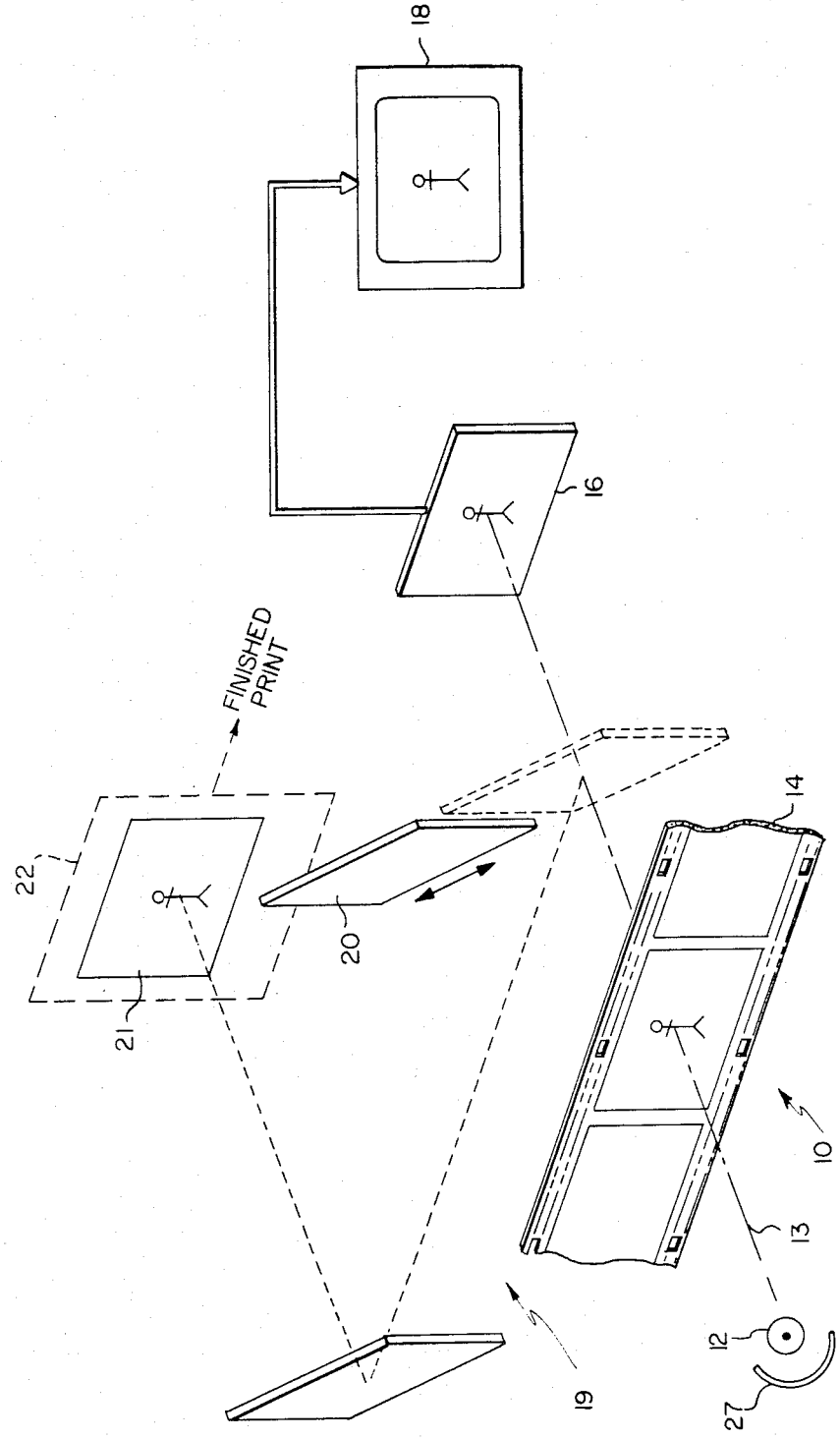
FIG. 1 is a general schematic showing a unitary film video player/printer apparatus.

FIG. 1 illustrates generally a unitary film video player/printer 10. In a video display mode, a light source 12 serves to project light along an optical centerline 13, to illuminate a frame of a color negative photographic film 14, and to project the illuminated image onto a solid state image sensor 16. The sensor 16, in response to the image projected, produces in a known manner a signal which is processed (by means not shown) to produce a positive color video signal. A video monitor 18, such as a standard television receiver, receives the video signal and produces a positive display of the film image.

In a printing mode, optical means 19, including a movable mirror 20, serve to direct the illuminated image onto a photographic print material 21 of a printer 22, which delivers a finished photographic print to a customer.

The film video player/printer 10, according to the invention, allows an operator to control the magnification of the film image and the portion of the magnified image that is displayed on the monitor 18 in a format (vertical or horizontal) portrayed by the display. When a desired composition is achieved, the printer 22 produces an optical print corresponding to the image arrangement displayed on the monitor 18. A problem faced with meeting this set of conditions is to display any given film image in a normal viewing orientation and in a desired format (either vertical or horizontal), portrayed by the display, while keeping the complexity of the apparatus to a minimum.

With the apparatus of FIG. 1, a film image in a horizontal format, as shown, is automatically displayed in a normal operator-viewing position, as required by the invention. As used herein, the term "viewing position" is synonymous with "viewing orientation". With a film image in a vertical format, the corresponding video image would be rotated 90°. There are, however, three alternative ways to display a vertical format picture in a normal viewing position. In a first arrangement, the image sensor 16 rotates 90° relative to the film 14. An arrangement of this type is known in the art, as exemplified by the teachings of U.S. Pat. No. 4,485,406, which is assigned to the assignee of the present invention. In a second way, the video monitor 18 rotates 90° relative to the image sensor 16. With the third arrangement, the film 14 rotates 90° relative to the image sensor 16. Alternatively, as is also taught in U.S. Pat. No. 4,485,406, optical means, such as a rotatable dove prism, disposed in the optical path of the image sensor 16, rotates the film image.

The invention also requires that a photographic print correspond to the video image displayed. In order to make a photographic print corresponding to the video image, it is necessary to effect a relative rotation of 90° between the film image and the print material, whenever a print of vertical format is to be made. To achieve this result, either the print material 21 or the film image must rotate 90°. The latter, of course, may be accomplished alternatively using a rotatable dove prism.

As indicated above, an object of the invention is that it be of minimal complexity. To that end, we chose to provide a mechanism, as described in detail hereinbelow, to rotate the film itself 90°, because the same mechanism used to rotate the film to provide a print of vertical format, can be used to display a film image of vertical format in a normal viewing position.

The invention also requires that the display be portrayed in a format corresponding to the format of a print to be made. The aspect ratio of a standard television screen (vertical dimension to horizontal dimension) is approximately 3:4. Thus, when the full screen of a television shows the film image in a normal viewing position, the video image is portrayed in a horizontal format.

To provide for a video display, portraying either a horizontal or a vertical format, electronic display means are provided, in accordance with the invention, for selectively displaying a given rectangular reticle on the video monitor, in either a vertical or a horizontal position. The reticle serves to define the border of the image to be printed; thus, the orientation of the reticle defines the format of the display, and thereby the format of the print to be made.

Figure 2:
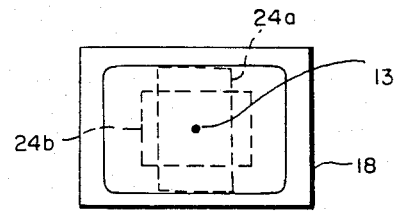
FIG. 2 shows a video monitor of the film video player/printer apparatus having a reticle display for selectively portraying a desired format of a print to be made.

FIG. 2 illustrates the screen of the video monitor 18 having a reticle 24(a,b) displayed thereon. In this figure, the vertically oriented reticle 24a corresponds to a vertical print format, and the horizontally oriented reticle 24b corresponds to a horizontal print format. For a reason made apparent hereinbelow, we selected the reticles so that their respective areas are the same, and so that the ratio of their short dimension to their long dimension is the same as the aspect ratio of 35 mm photographic film (2:3). We further selected the reticles so that the height of the vertical reticle 24a just fills the short dimension of a standard television screen.

Reference should now be had to FIGS. 3(a,b,c,d): The screen of the video monitor 18 of FIG. 3a includes an image (D F P), corresponding to a frame of a photographic film. After the film image is magnified and is moved horizontally to the right and vertically downward, relative to the optical centerline 13 of the film video player/printer 10, the video image may now appear as shown in FIG. 3b. When a vertical print is to be made of the image D of FIG. 3b, the screen of the monitor 18 would include the reticle 24a, as shown in FIG. 3c, to portray the video image in a vertical format. Likewise, when a horizontal print is to be made, the screen would include the reticle 24b, as shown in FIG. 3d, to portray the image D in a horizontal format.

Figure 3A:
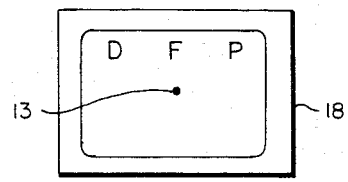
FIGS. 3a-3d includes drawings illustrating the use of the video monitor of FIG. 2.
Figure 3B:
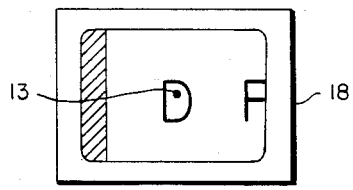
Figure 3C:
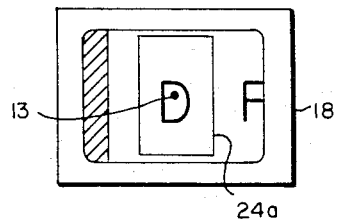
Figure 3D:
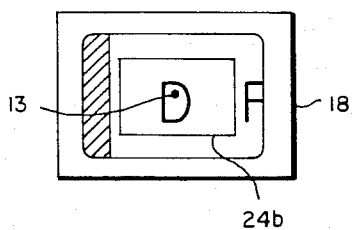

To make a print corresponding to the display of FIG. 3c, requires that the film first be rotated 90°. For that purpose, the film 14 is rotated about the optical centerline 13 of the film video player/printer 10. To make a print according to the display of FIG. 3d, requires, on the other hand, no rotation of the film.

From the foregoing, it will be clear to those skilled in the art that the film 14 is selectively rotated about the optical centerline 13, both for the purpose of displaying the film image in a normal viewing position, and for the purpose of making a print corresponding to the image and format portrayed. By rotating the film about the optical centerline 13, a print of a vertical format is made without a need to move the film either horizontally and/or vertically, to compensate for the rotation of the film. Additionally, because the reticles are centered and because the aspect ratio of the vertical reticle is the reciprocal of the aspect ratio of the horizontal reticle, no subsequent zooming of the film image need be made to produce a print of vertical format corresponding to the image displayed.

Figure 4:
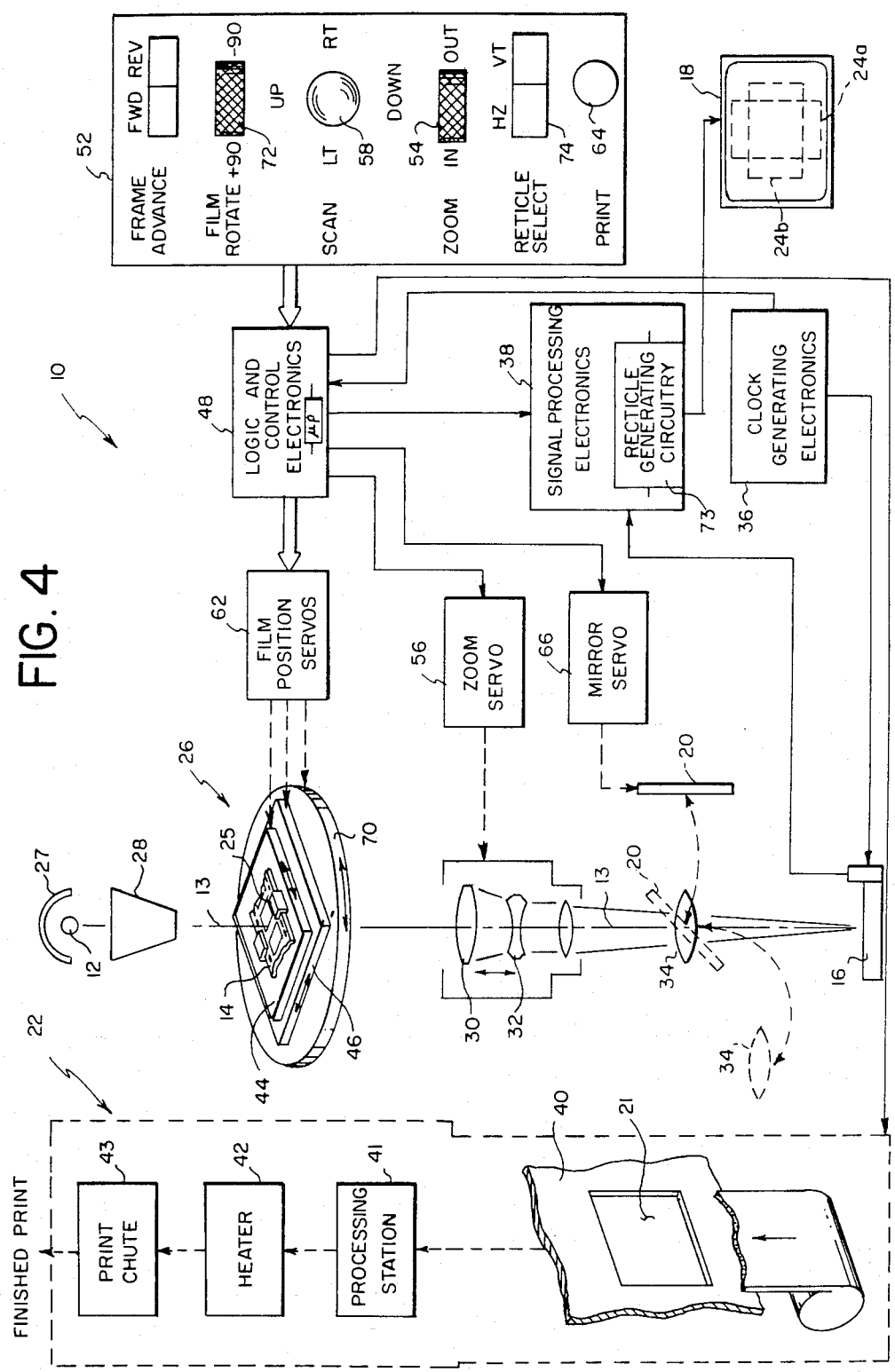
FIG. 4 is a schematic of a film video player/printer in accordance with the present invention.

FIG. 4 shows in greater detail the film video player/printer 10 according to the present invention. Elements of the apparatus of FIG. 4 that are structurally or functionally equivalent to the elements of FIG. 1 are identified by like numerals.

The film video player/printer 10 of FIG. 4 includes the light source 12 for periodically illuminating a 35 mm color negative photographic film 14, which is located in a film gate 25 on a movable platform, designated generally 26. A flash reflector 27, adjacent the light source 12, directs reflected flash light through an integrating bar 28, which functions to spread the light so that there are no illumination discontinuities over the film plane.

In a video display mode, a zoom lens 30, having a movable element 32, projects an image of the illuminated film 14 via a taking lens 34 onto the solid state image sensor 16. Clock generating electronics 36 serve to control the image sensor 16 to produce, in a known manner, a signal corresponding to the film image projected onto the sensor. An image sensor of the aforementioned type is disclosed in U.S. Pat. No. 4,495,516, assigned to the assignee of the present invention, the disclosure of which is incorporated herein by reference.

Signal processing electronics 38 receive the output of the sensor 16 corresponding to the film image, and produce a "positive" video signal, to display a positive image of the film 14 on the video monitor 18.

In a photographic print mode, a movable carrier plate (not shown) positions the aforementioned reflecting mirror 20 in the optical path of the light source 12, thereby altering the length path away from the image sensor 16. The mirror 20 serves to deflect flash light, projected via the film 14, through print filters and a shutter (not shown) onto the printing material 21, which is located at an exposure plane 40 of printer 22. After passing through a processing station 41, the printing material 21 enters a heater 42, which serves to accelerate the printing cycle. The heater 42 feeds the heater strip of printing material 21 to a print exit chute 43, which delivers a finished photographic print to a customer.

The zoom lens 30 of the player/printer 10 features a range of magnification so that at its lowest magnification the film image just fills the image sensor 16, and at its highest magnification, the resolution of the magnified image on the image sensor is substantially equal to the resolution of a standard television. The ratio of the dimensions of the screen of the video monitor 18 is the same as the ratio of the corresponding dimensions of the image sensor 16. The film image may be zoomed so that less of the image falls on the image sensor 16. The printer 22 and the film 14 are arranged with respect to each other so that only the portion of a normally oriented image that fills the reticle displayed is printed.

The platform 26 of the player/printer 10 features an X-Y translation stage for moving the film 14 horizontally and/or vertically, relative to the image sensor 16, to selectively crop the film image. For that purpose, the X-Y translation stage includes a first platform 44, which carries the film 14, movable in the longitudinal direction of the film, and a second platform 46, which carries the platform 44, movable parallel to the film in a direction perpendicular to its length.

Microprocessor-based logic and control electronics 48 serve to control the film video player/printer 10 via operator input provided through a control panel 52. For the purpose of controlling the zoom lens 30, an operator rotates a knurled zoom wheel 54 in a desired direction of magnification. In response to the actuation of the wheel 54, the logic and control electronics 48 cause a zoom servo 56, comprising a stepper motor, to drive the lens 32 in the appropriate direction.

To crop the film image, the operator rotates an omnidirectional control ball 58 in a desired direction; and in response to the amount and the direction of the rotation of the ball 58, the logic and control electronics 48 cause a pair of film position servos 62, each of which comprises a stepper motor, to drive a corresponding one of the platforms 44 and 46 in the appropriate direction.

The control panel 52 further includes a print button 64. The logic and control electronics 48, in response to the actuation of the print button 64, cause the printer 22 to make a print corresponding to the video image within the reticle displayed. For that purpose, a stepper motor of a mirror servo 66 suitably positions the mirror 20.

As described previously herein, the background art relating to film video player/printer apparatus has suffered from disadvantages in the failure to provide a video image in a normal viewing position, in a format portrayed by the video display.

To overcome those disadvantages, a preferred embodiment of the invention includes a rotary stage of the platform 26, in the form of a turntable 70, which carries the aforementioned X-Y translation stage. The turntable 70 serves to rotate the film 14 about the optical centerline 13, independently of the X-Y translation stage.

For the purpose of controlling the turntable 70, an operator actuates a knurled control wheel 72 (or push button) of the control panel 52, to achieve a desired direction of rotation. In response to the actuation of the wheel 72, the logic and control electronics 48 cause a film position servo 62 corresponding to the rotary stage to rotate the turntable 70 the appropriate amount and in the appropriate direction.

The signal processing electronics 38 include reticle-generating circuitry 73 for electronically generating the horizontally or vertically oriented rectangular reticle 24(a,b), which is centered on the screen of the video monitor 18. To that end, the signal processing electronics 38 receive through the logic and control electronics 48 a command from a control 74 of the control panel 52 corresponding to the orientation of the reticle selected. In response to that command, the reticle-generating circuitry 73 modifies the output video signal of the signal processing electronics 38, to superimpose the reticle selected with the video image displayed. Video circuitry for generating predetermined displays are well known in the art, as exemplified by U.S. Pat. No. 3,345,458, the disclosure of which is incorporated herein by reference.

When an operator actuates the print button 64, the logic and control electronics 48 cause the printer 22 to operate, to make a print of the video image, in the format portrayed. To that end, the logic and control electronics 48, based on an input corresponding to the reticle previously selected, cause the rotatable platform 70 to automatically position the film 14 for a print corresponding to the format portrayed by the reticle displayed.

The operation of the film video player/printer 10, and the function of the logic and control electronics 48 will now be described with reference to the illustrations of FIG. 5.

Figure 5:
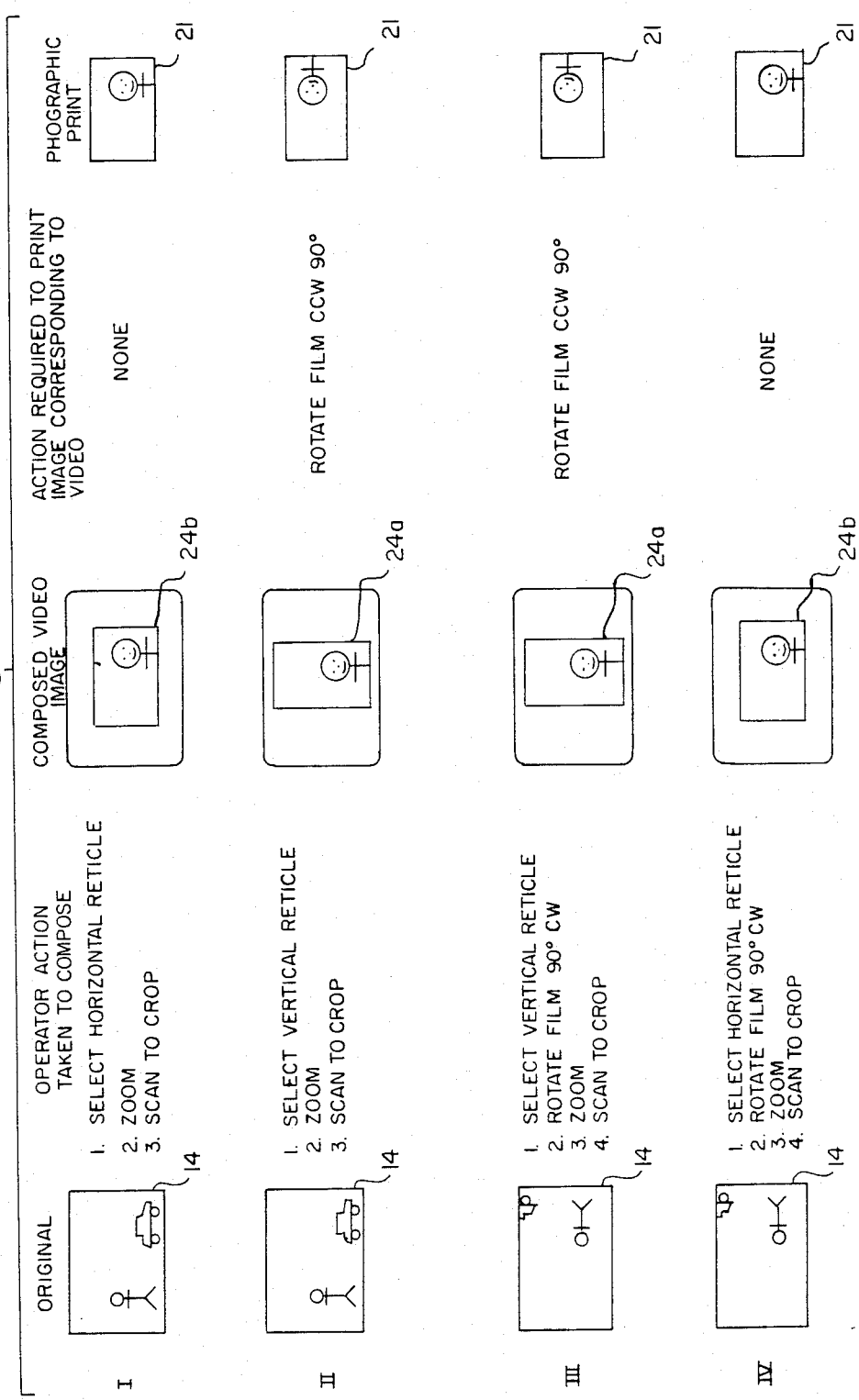
FIG. 5 is a drawing illustrating various photographic originals and the player/printer operations required to make a desired photographic print.

Example No. I of FIG. 5 illustrates the case when an original is in a horizontal format and the operator selects the horizontal reticle 24b to portray the format of the image displayed. Under operator control through the zoom wheel 54 and the control ball 58, the film image to be printed is magnified and composed within the reticle 24b. In this situation, the printer 22, in response to an operator print command through the print button 64, makes a print corresponding to the composition and format of the image displayed, with the film 14 positioned for printing exactly as it was positioned for the video display.

Example No. II of FIG. 5 illustrates the case where the original is in a horizontal format and the operator selects the vertical reticle 24a to portray a vertical format of the image displayed. After composing and zooming for display, the logic and control electronics 48, in response to a print command, cause the film position servo 62 to rotate the platform 70 automatically by 90°, to position the film 14 for an optical print of a vertical format of the image displayed. Because the film 14 is rotated about the optical centerline 13 and because the vertical reticle 24a has the same area, but reciprocal aspect ratio as the horizontal reticle 24b, the printer 22 makes a vertical format print, without any cropping or zooming, respectively, subsequent to the rotation of the film for printing.

Example No. III of FIG. 5 illustrates the case where the original is in a vertical format and the operator selects the vertical reticle 24a, to portray the image displayed in the format of the original. When the original is in a vertical format, the operator actuates the control wheel 72, to cause the appropriate film position servo 62 to rotate the platform 70 by 90°, so that the film image is diplayed in a normal operator-viewing position. After composing and zooming, the logic and control electronics 48, in response to an operator print command, then cause the platform 70 to automatically rotate the film in the reverse direction 90°, to reposition the film 14 for a print of a vertical format. Again, no zooming or cropping is necessary, subsequent to the rotation of the film for printing, for the print to correspond to the image displayed.

The final example of FIG. 5 illustrates the case where the original is in a vertical format and the operator selects the horizontal reticle 24b to portray the image displayed. With the original in a vertical format, the wheel 72, under operator control, causes the film 14 to rotate by 90°, so that the film image is displayed in a normal viewing position. Following composing and zooming, the logic and control electronics 48, in response to a print command, cause the printer 22 to make a print of the image displayed, with the film positioned exactly as required for the display.

By rotating only the film and/or a reticle portraying the format of a film image displayed, while fixing the position of the image sensor 16, the print material 21, and the video monitor 18, all possible arrangements of the film image are displayed in a normal viewing orientation, with the complexity of the film video player/printer 10 kept to a minimum. With this minimal complexity, a print is obtained of exactly the image and format portrayed, without any need to zoom or crop, to compensate for the positioning of the film for a print corresponding to the video display.

The invention has been described in detail with reference to the figures, however, it will be appreciated that variations and modifications are possible within the spirit and scope of the invention.

What is claimed is:

1. In a film video player including photographic printer means for making an optical print from a photographic film corresponding to a film image displayed on a video monitor, the improvement comprising:
   (a) electronic display means for selectively displaying a rectangular reticle that is substantially centered on said video monitor, the orientation of the reticle portraying the format of a print to be made; and
   (b) logic and control means, responsive to the framing format portrayed by the reticle, for coordinating said printer means and the photographic film, to cause said printer means to make a photographic print corresponding to the image displayed in the format portrayed on said video monitor.

2. In a film video player including photographic printer means for making an optical print from a photographic film corresponding to a film image displayed on a video monitor, the improvement comprising:
   (a) electronic display means for selectively displaying a rectangular reticle on said video monitor, the orientation of the reticle portraying the format of a print to be made;
   (b) rotating means for selectively effecting a rotation of the film image about an optical centerline perpendicular to the plane of the film; and
   (c) logic and control means, having an output coupled to said rotating means and an input responsive to the reticle displayed, for causing said rotating means to selectively rotate the film image in accordance with the framing format portrayed so that said printer means makes a photographic print corresponding to the image displayed in the format portrayed on said video monitor.

3. A film video player as defined in claim 2 wherein said rotating means includes a mechanism, responsive to an output of said logic and control means, for rotating the photographic film relative to said printer means.

4. In a film video player including photographic printer means for making an optical print from a photographic film corresponding to a film image displayed on a video monitor, the improvement comprising:
   (a) electronic display means for selectively displaying a rectangular reticle on said video monitor, the orientation of the reticle portraying the format of a print to be made;

(b) rotating means for selectively effecting a rotation of an image corresponding to that of the photographic film, to provide a video display of the film image in a normal viewing orientation; and (c) logic and control means, having an input responsive to the framing format portrayed by the reticle and an output coupled to said rotating means, for causing said rotating means to rotate the photographic film in a printing mode, to cause said printer means to make a photographic print corresponding to the image displayed in the reticle in the format portrayed.

5. A film video player as defined in claim 4 wherein said rotating means includes a mechanism for rotating the photographic film about an optical centerline.

6. A film video player as defined in claim 4 wherein a vertically oriented reticle portrays a print to be made in a vertical format and a horizontally oriented reticle portrays a print to be made in a horizontal format.

7. A film video player as defined in claim 6 wherein the area of the horizontally oriented reticle is the same as the area of the vertically oriented reticle.

8. A film video player as defined in claim 7 wherein the aspect ratio of the horizontally oriented reticle is the reciprocal of the aspect ratio of the vertically oriented article.

9. In a film video player/printer apparatus having a solid state image sensor for producing a video signal to display a film image on a video monitor, zoom means for selectively varying the magnification of the image displayed, cropping means for displaying a portion of film image by translating the magnified image along first and second orthogonal directions, and photographic printer means for making an optical print from the film corresponding to a magnified image displayed on said video monitor, the improvement comprising:

(a) electronic display means for selectively displaying and rotating a given rectangular reticle on said video monitor, the reticle portraying the border, and thereby the format, of a print to be made; and (b) logic and control means, having an input responsive to the orientation of the reticle selected, for coordinating the orientation of the photographic film with respect to said printer means, to cause said printer means to make a photographic print corresponding to the portion of th magnified image displayed in the format portrayed on said video monitor.

10. A film video player/printer apparatus as defined in claim 9 wherein said cropping means provides for displaying a portion of the film image by translating the photographic film along the first and second orthogonal directions relative to said image sensor.

11. In a film video player/printer apparatus having a solid state image sensor for producing a video signal to display an image of a photographic film on a video monitor, zoom means for selectively varying the magnification of the image displayed, cropping means for displaying a portion of the film image by translating the magnified image along first and second orthogonal directions, and photographic printer means for making an optical print from the film corresponding to a magnified image displayed on said video monitor, the improvement comprising:

(a) electronic display means for selectively rotating a given rectangular reticle on said video monitor, the reticle portraying the border, and thereby the format, of a print to be made;

(b) rotating means, responsive to an input supplied by an operator, for selectively effecting a rotation of the photographic film, to orient the portion of the magnified film image displayed in a normal viewing position of the operator; and (c) logic and control means, having an input responsive to the reticle displayed and an output coupled to said rotating means, for selectively rotating the photographic film relative to said printer means, to cause said printer means to make a photographic print corresponding to the portion of the magnified image displayed in the reticle selected.

* * * * *